United States Patent
Tang et al.

(10) Patent No.: US 7,948,352 B2
(45) Date of Patent: May 24, 2011

(54) WIRELESSLY POWERED SECONDARY ELECTRICAL DISTRIBUTION EQUIPMENT

(75) Inventors: Le Tang, Cary, NC (US); Mohamed Y. Haj-Maharsi, Garner, NC (US); Ernst Scholtz, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 179 days.

(21) Appl. No.: 12/246,974

(22) Filed: Oct. 7, 2008

(65) Prior Publication Data

US 2009/0091416 A1 Apr. 9, 2009

Related U.S. Application Data

(60) Provisional application No. 60/978,213, filed on Oct. 8, 2007.

(51) Int. Cl.
*H01H 71/20* (2006.01)
*H01H 71/10* (2006.01)
*H02B 1/26* (2006.01)
*G08B 21/00* (2006.01)

(52) U.S. Cl. ........ 337/171; 337/168; 361/622; 361/626; 340/687

(58) Field of Classification Search ............... 337/171, 337/168; 361/622, 626; 340/687
See application file for complete search history.

(56) References Cited

U.S. PATENT DOCUMENTS

| | | | | |
|---|---|---|---|---|
| 3,026,391 A * | 3/1962 | Bridges et al. | ................ | 337/417 |
| 3,810,060 A * | 5/1974 | Hubbard | ....................... | 337/155 |
| 3,823,281 A * | 7/1974 | Wilson | ...................... | 200/50.24 |
| 4,017,698 A * | 4/1977 | Kuhn et al. | ................ | 200/50.21 |
| 4,045,762 A * | 8/1977 | Foulkes | ....................... | 337/401 |
| 4,272,751 A * | 6/1981 | Biller et al. | .................... | 337/231 |
| 4,321,575 A * | 3/1982 | Koszewa et al. | ............... | 337/168 |
| 4,636,764 A * | 1/1987 | Mee et al. | ..................... | 337/169 |
| 4,935,715 A * | 6/1990 | Popeck | ........................ | 337/169 |
| 5,300,914 A * | 4/1994 | Hartman et al. | .............. | 337/249 |
| 5,477,017 A * | 12/1995 | Swindler et al. | ........... | 200/50.24 |
| 5,583,729 A * | 12/1996 | Hassler et al. | ................... | 361/39 |
| 5,612,661 A * | 3/1997 | Twenter et al. | ............... | 337/169 |
| 5,982,139 A * | 11/1999 | Parise | .......................... | 320/109 |
| 6,114,834 A * | 9/2000 | Parise | .......................... | 320/109 |
| 6,133,723 A * | 10/2000 | Feight | ........................... | 324/133 |
| 6,211,768 B1 * | 4/2001 | Cress et al. | .................... | 337/292 |
| 6,392,526 B1 * | 5/2002 | Roberts et al. | ................ | 337/178 |
| 6,429,662 B1 * | 8/2002 | Cuk et al. | ...................... | 324/547 |
| 6,468,127 B1 * | 10/2002 | Lee | ............................... | 446/457 |
| 6,633,026 B2 * | 10/2003 | Tuominen | ..................... | 250/205 |
| 6,792,259 B1 * | 9/2004 | Parise | ......................... | 455/343.1 |

(Continued)

OTHER PUBLICATIONS

A.Karalis, J.D.Joannopoulos and M.Soljacic,"Efficient Wireless Non-Radiative Mid-Range Energy Transfer," Annals of Physics, Apr. 17, 2007, Cambridge, MA.

(Continued)

*Primary Examiner* — Jayprakash N Gandhi
*Assistant Examiner* — Bradley H Thomas
(74) *Attorney, Agent, or Firm* — Paul R. Katterle; Michael C. Prewitt

(57) ABSTRACT

A wireless secondary assembly is disclosed for use in an electrical distribution network. The secondary assembly may include a wireless source electrically connected to a first electric cable and adapted to emit an electromagnetic power signal. A wireless receiver is electrically connected to a secondary device and adapted to receive the electromagnetic power signal and convert the electromagnetic power signal to electricity to power to secondary device.

14 Claims, 6 Drawing Sheets

U.S. PATENT DOCUMENTS

| | | | |
|---|---|---|---|
| 6,922,132 B2* | 7/2005 | Montante | 337/174 |
| 7,068,991 B2* | 6/2006 | Parise | 455/343.1 |
| 7,109,877 B2* | 9/2006 | Cuk | 340/638 |
| 7,378,933 B2* | 5/2008 | Rogers | 337/227 |
| 7,417,554 B2* | 8/2008 | Benke et al. | 340/638 |
| 7,480,149 B2* | 1/2009 | DeWard et al. | 361/728 |
| 7,495,574 B2* | 2/2009 | Rocamora et al. | 340/638 |
| 7,687,941 B2* | 3/2010 | Raghuprasad | 307/151 |
| 2005/0111533 A1* | 5/2005 | Berkman et al. | 375/220 |
| 2006/0072241 A1* | 4/2006 | Feliss et al. | 360/97.02 |
| 2006/0076946 A1* | 4/2006 | Shvach et al. | 324/126 |
| 2007/0268644 A1* | 11/2007 | Schweitzer et al. | 361/115 |
| 2008/0022673 A1* | 1/2008 | Morris et al. | 60/431 |

OTHER PUBLICATIONS

A.Kurs, A.Karalis, R.Moffatt, J.D.Joannopoulos, P.Fisher, and M.Soljacic, "Wireless Power Transfer via Strongly Coupled magnetic Resonances," Sciencexpress, Jun. 7, 2007/p. 2/10.1126/science. 1143254.

R.Steigmann and J.Endresen, "Introduction to WISA—Wireless Interface for Sensors and Actuators." V2.0 Jul. 2006, ABB Inc.

\* cited by examiner

US 7,948,352 B2

WIRELESSLY POWERED SECONDARY ELECTRICAL DISTRIBUTION EQUIPMENT

CROSS REFERENCE TO RELATED APPLICATION

This application claims the priority of U.S. provisional application Ser. No. 60/978,213 filed on Oct. 8, 2007, entitled "Wirelessly Powered Secondary Electrical Distribution Equipment" the contents of which are relied upon and incorporated by reference in their entirety, and the benefit of priority under 35 U.S.C. 119 is hereby claimed.

FIELD OF THE INVENTION

The invention relates to wireless energy transfer to electrical grid equipment and in particular to secondary equipment.

BACKGROUND

Power distribution networks include safety and protective equipment designed to protect the network and allow maintenance crews to quickly identify and repair faulty components. Such secondary power devices often require a dependable and stable power supply.

Powering these intelligent devices directly through wired means is often times difficult due to the high potential difference between power line and protective equipment. This issue is often referred to as "insulation coordination", wherein unwanted flashover is avoided between the line, which is at line potential (e.g. 11 kV) and the secondary device that may be at ground potential (i.e., close to 0V). A multitude of standards (e.g. IEC, ISO and ANSI) dictate the required clearance between a line and any other object. Thus, extending a wire from a scavenging unit on the high voltage line to the secondary device could have serious implications when trying to maintain the two voltage levels (e.g. 11 kV and 0V).

In lieu of hard wired power means, batteries have been employed to power these secondary power devices. However, batteries suffer from drawbacks as well. Secondary power devices, due to possible remote placement, typically require batteries that have a small profile and a long life. In some instances such functionality is not possible, and in others, the cost is prohibitive.

There is, therefore, a need in the art for an alternate approach to powering secondary power devices that is dependable and cost effective.

SUMMARY OF THE INVENTION

According to one embodiment of the present invention, a cutout assembly is disclosed for use in an electrical distribution network to electrically connect a first electric cable with a second electrical cable. The cutout includes an electrically non-conductive insulator having a first end and a second end, a first terminal assembly secured to the first insulator, a second terminal assembly secured to the second insulator end, a fuse assembly pivotally secured to the second terminal and movable between a locked out position and an engaged position, a motor module secured to the second terminal and adapted to move the fuse assembly from the locked out position to the engaged position, a wireless source electrically connected to the first electric cable and adapted to emit an electromagnetic power signal, and a wireless receiver electrically connected to the motor module and adapted to receive the electromagnetic power signal and convert the electromagnetic power signal to electricity to power to the motor module.

According to another embodiment of the present invention, a fault indicating assembly is disclosed for monitoring fault conditions at a power line junction including a feeder line electrically connected to a first and a second downstream line at an electrical pole. The fault indicating assembly includes a source module secured to the feeder line and including a voltage source converter to convert induced current from the feeder line to a voltage for a first resonator which is adapted to transmit an electromagnetic energy signal, a receiving module secured to the pole, the receiving module including a second resonator that receives the electromagnetic energy signal and converts the electromagnetic signal to electrical energy, a light is selectively activated upon reception of a fault signal, the light being powered by the second resonator, a first current sensor secured to one of the first or second downstream lines and adapted to monitor the first or second downstream line for a fault condition, wherein when a fault condition is detected, the current first sensor is adapted to transmit the fault signal.

DETAILED DESCRIPTION OF THE INVENTION

Figure 1:
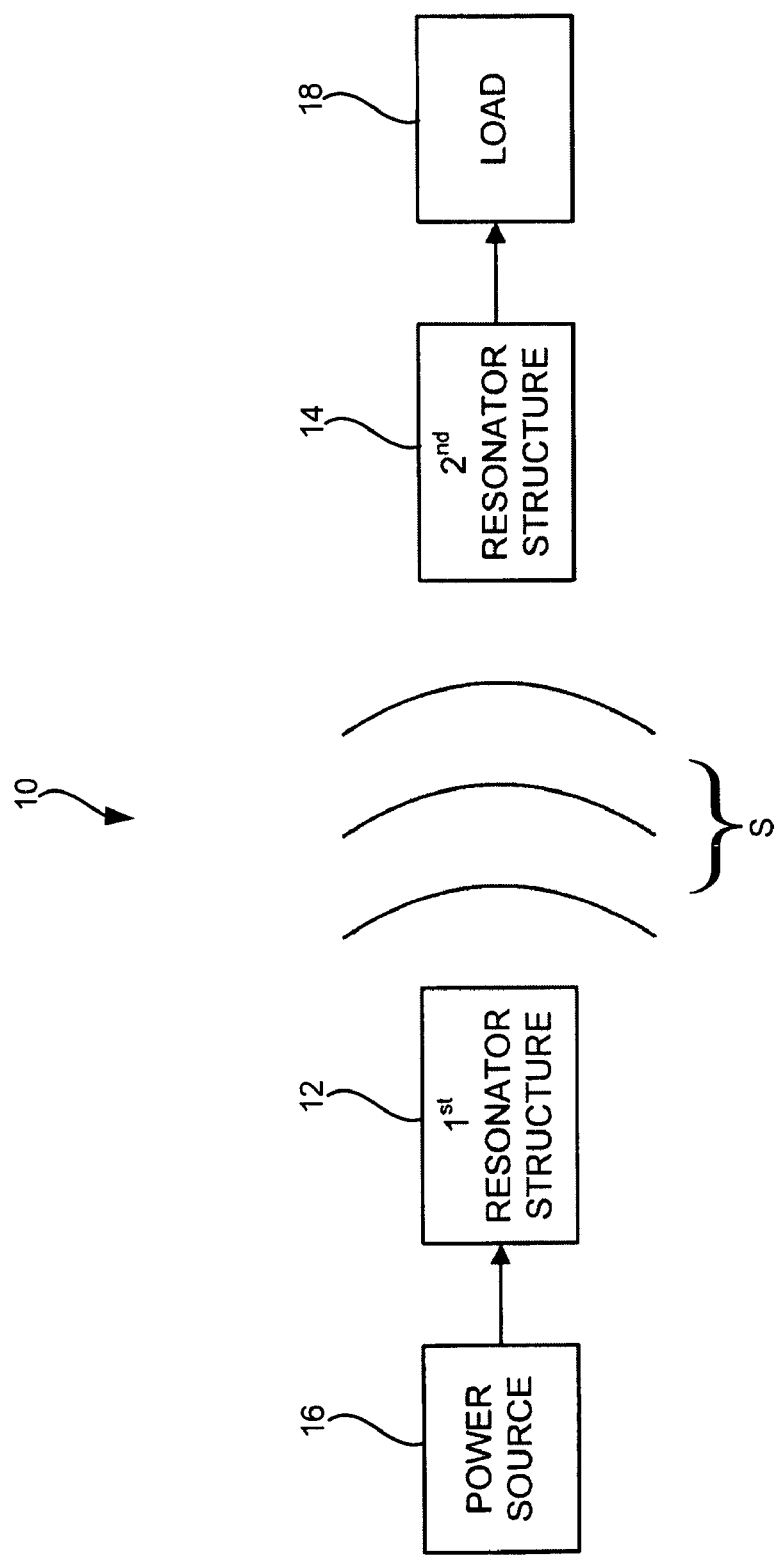
FIG. 1 shows a schematic view of the wireless energy transfer mechanism according to the present invention.

The present invention employs a wireless energy transfer mechanism 10 to power various types of secondary power equipment. Generally, the wireless energy transfer mechanism 10 may include a first resonating structure 12 and a second resonating structure 14 that are spaced by a distance D. First resonating structure 12 may be powered by a power source 16 and transmit a signal S. Second resonating structure 14 receives the power signal S and converts it to power for use by a load 18.

The distance between the two resonators can be larger than the characteristic size of each resonator. Non-radiative energy transfer between first resonating structure 12 and second resonating structure 14 is accomplished by coupling the resonant-field evanescent tails. The resonating structures 12 and 14 transfer energy through long-lived oscillatory resonant electromagnetic modes, with localized slowly evanescent field patterns. The basis of this approach is that two same-frequency resonant objects tend to couple, and at the same time interact weakly with off-resonant environmental objects. Using this approach, a mid-range wireless energy-exchange can be achieved, with modest transfer and dissipation of energy into other off-resonant objects. The omnidirectional but stationary (non-lossy) nature of the near field makes this mechanism suitable for powering small intelligent devices.

The first resonating structure 12 may include a first resonant frequency $w_1$, a resonance width $\Gamma_1$, a first Q-factor $Q_1$ and a characteristic size $L_1$. The second resonating structure includes a second resonant frequency $w_2$, a second resonance width $\lceil_2$, a second Q-factor $Q_2$ and a characteristic size $L_2$. In one or more embodiments, the two frequencies $w_1$ and $w_2$ are within the narrower of the two resonance widths $\lceil_1$, and $\lceil_2$. A more complete discussion of the wireless energy mechanism is described in PCT Publication No. 2007/008646, the contents of which are hereby incorporated by reference.

According to another embodiment of the present invention, wireless power may be transmitted via primary and secondary windings according to the WISA approach. Such a method and apparatus is described in U.S. Pat. No. 6,597,076, the contents of which are hereby incorporated by reference.

Figure 2:
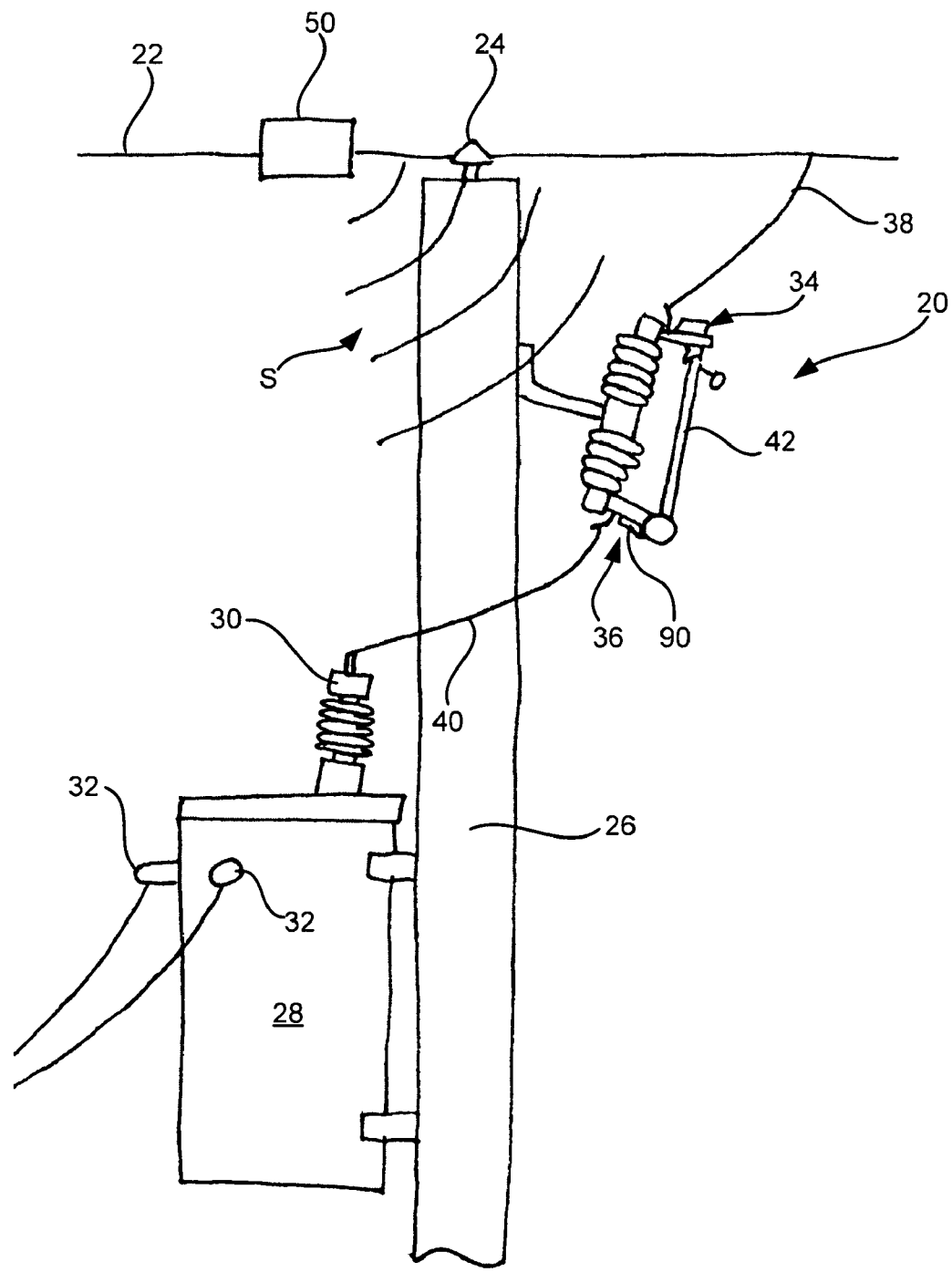
FIG. 2 shows a side view of a cutout powered by a wireless energy transfer mechanism.

Referring now to FIG. 2, an intelligent device incorporates the wireless energy transmission mechanism described above. In the present embodiment, the intelligent device is a cutout, generally indicated by the numeral 20, having an automatic reclosing feature. A high voltage line 22 carries the single phase current of a three phase power distribution system. The high voltage line 22 may be at a voltage of between 3.3 kV-110 kV, for example. The medium voltage line 22 may be supported by a cable mount 24 made of insulating material and secured to a power pole 26. In the present embodiment, the cutout 20 is positioned between line 22 and a single-phase transformer 28. It should be appreciated, however, that the transformer is merely exemplary and cutout 20 may be utilized at any number of locations on a distribution network. Transformer 28 may include a primary terminal 30 connected to a primary winding (not shown) of the transformer. The transformer 28 may also include secondary terminals 32, connected to a secondary winding (not shown) of the transformer.

Cutout 20 is mounted to pole 26 and includes an input end 34 and an output end 36. A first wire 38 is connected between the medium voltage line 22 and the input end 34 and a second wire 40 is connected between the output end 36 and primary terminal 30 of transformer 28. Thus, current drawn by transformer 28 is drawn through the first wire 38 to input end 34, through a fuse 42, through the output end 36 and through the second wire 40 to the primary terminal 30 on transformer 28.

Cutout 20 includes powered electrical devices that receive power from a wireless source 50 that is secured to high voltage line 22. Wireless source 50 may be modular and securable to the high voltage line 22 at any number of locations. In one embodiment, wireless source may include a single-turn transformer (e.g. a current transformer) that draws power from the high voltage line 22 to power the unit at a frequency of 60 Hz in the United States, and 50 Hz in other parts of the world. Wireless source 50 includes a first resonator (not shown) that emits an electromagnetic signal S at a higher frequency (in the MHz range) than the frequency of the signal harvested from the line.

Figure 3:
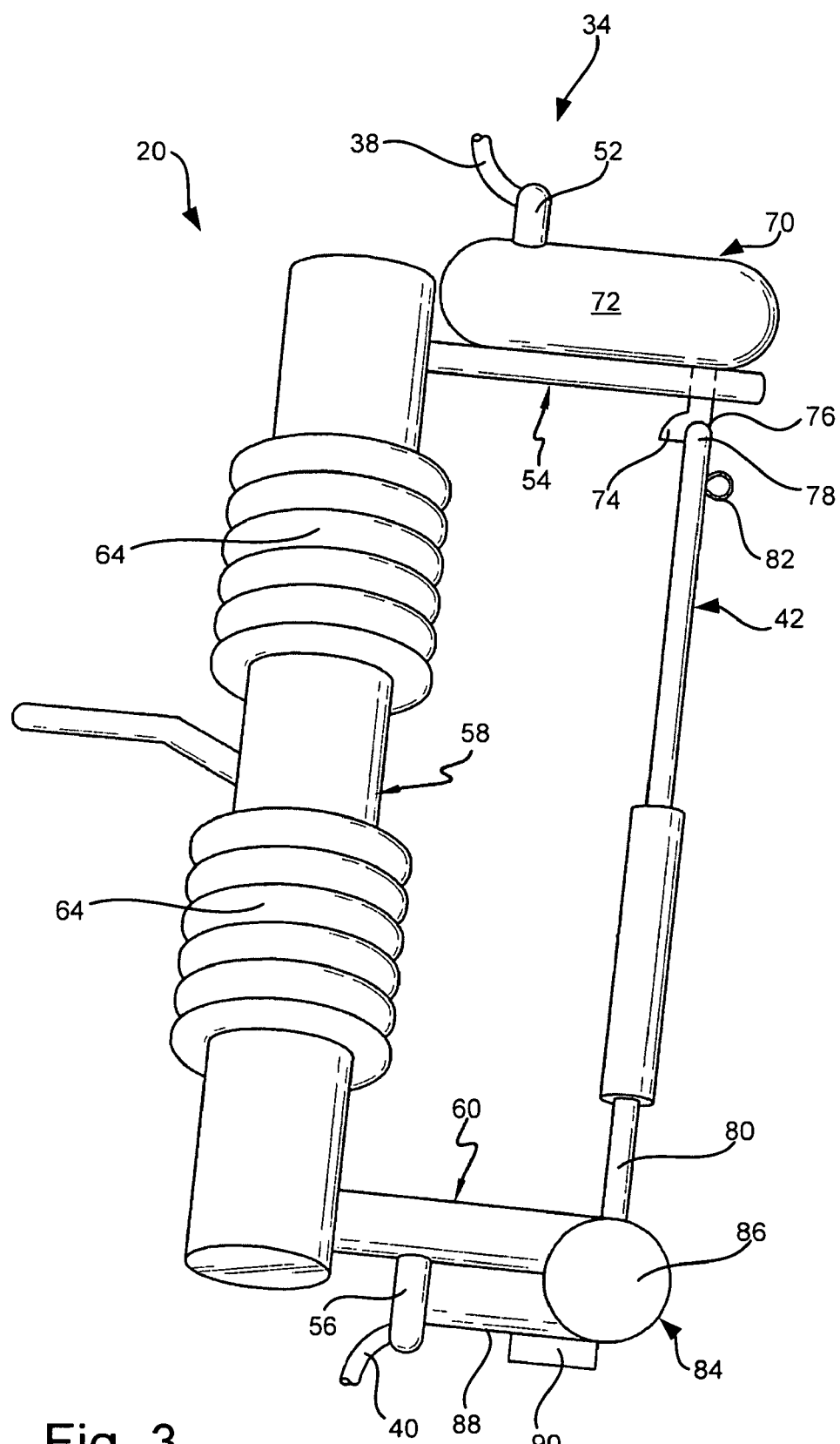
FIG. 3 shows an enlarged view of the cutout according to the present invention.

Referring now to FIG. 3, cutout 20 is shown in greater detail. First wire 38 is secured at input end 34 to a mounting bracket 52 of an upper terminal assembly 54 and second wire 40 is secured to the mounting bracket 56 of a lower terminal 58. Upper and lower terminals 54 and 58 are spaced by an insulator 60 and fuse assembly 42. Insulator 60 has an elongated central stem portion 62 defining a longitudinal direction, and a plurality of longitudinally spaced apart skirts 64 extending from stem portion 62. As is known in the art, insulator 60 is composed of non-electrically conductive materials and is attached to pole 26 or other support structure via bracket 66.

Insulator 60 is a holder for fuse assembly 42, and under normal operating conditions maintains fuse assembly 22 in the upright or operative position. Cutout 20 is configured to allow fuse assembly 42 to swing downwardly away from upper terminal 54 under certain conditions. Bottom terminal assembly 58 therefore engages the bottom of fuse 42 and allows pivotal movement thereon.

Top terminal 54 carries a reclosing mechanism 70 that both secures fuse 42 to upper terminal 54 and provides the electrical link between bracket 52 and fuse 42. Reclosing mechanism 70 includes an outer housing 72 that protects and contains the operating electronics. A movable electrically conductive engaging arm 74 extends downwardly from housing 72. The engaging arm 74 is adapted to move between contact position (shown in FIG. 3) and a release position, wherein engaging arm 74 disengages from fuse assembly. Engaging arm 74 may be composed of a resilient metallic material and include a C-shaped catch 76 that receives an upper contact end 78 of fuse 42. Thus, engaging arm 74, while positioned in the contact position, can receive and retain the upper contact end 78 of fuse assembly 22 within catch 76. Though the present embodiment shows a C-shaped catch, it should be appreciated that other engaging arm designs may be utilized to receive and thereafter hold upper contact end 78, for example, a one-way latch. It should further be appreciated that, though the present engaging arm 74 moves in a pivoting fashion, other movements are contemplated. For example, engaging arm 74 may move up and down along the longitudinal axis of fuse 42.

While in the operative or closed position, fuse assembly 42 engages and electrically closes the circuit between first wire 38 and second wire 40. Likewise, when fuse assembly 42 is in the inoperative position, with upper contact 78 not contacting engaging arm 74, the electrical connection is open between first and second wires 38 and 40.

Cutout 20 provides both primary and failsafe protection against over-currents that would otherwise damage downstream components. The primary protection is provided by recloser mechanism 70 and failsafe protection is provided by fuse assembly 42.

The fuse assembly 42 of the present invention includes an internal fuse element that extends the approximate length of fuse assembly 42 and across a lower contact end 80. Fuse assembly 42 also has a circular ring member 82 located near the upper contact end 78 for inserting a hot stick used by a utility company lineman. The hot stick allows the lineman to manually open the electrical connection thereby allowing the lineman to safely replace the fuse assembly 42 or perform repairs on downstream equipment.

During normal operation, fuse assembly 42 is in the engaged/upright position so that upper contact end 78 is held by engaging arm 74. While in this orientation, electricity may be transmitted from first wire 38, through reclosing mechanism 70, through fuse assembly 42 and thereafter to second wire 40. Reclosing mechanism 70 constantly monitors the electrical current passing through fuse 42. When that current rises above a predetermined threshold, reclosing mechanism 70 temporarily trips or breaks the electrical connection between first wire 38 and fuse assembly 42. After a predetermined period of time, the electrical connection is restored. If, when the electrical connection is restored, the current again exceeds the threshold limit, the reclosing mechanism 70 will again temporarily trip or break the electrical circuit between first wire 38 and fuse assembly 42. This loop will continue until the fault is cleared, i.e. the current load returns to a level below the threshold value, or until a preset number of breaks is reached. When the preset number of breaks is reached, the recloser mechanism determines that a lockout condition is met. At that time, a solenoid (not shown) in housing 72 causes engaging arm 74 to pivot forward to the open or release position. Thereafter, the circuit remains in the open or locked-out state.

In this manner, multiple reclosing actions may be performed prior to final lockout of the cutout. This is particularly useful when the fault is a singularity such as a lightning strike or temporary contact with a tree branch. In such instances, the reclosing mechanism 70 will sense the fault, temporarily open the circuit and then reclose the circuit. This results in minimized transmission interruption while maintaining the same level of protection for downstream users.

Fuse assembly 42 operates similarly to prior art fuse assemblies, in that when sufficiently high current flows through the fuse assembly 42 the fuse element will blow. The fuse assembly, in turn, releases the engaging pressure on the engaging arm 74 by released tension on the fuse element. The released tension causes top contact end 78 to slightly drop vertically downward, and the fuse assembly 42 then swings outward and down to a locked out and electrically open position. The fuse assembly current rating is chosen so that, under normal fault conditions the recloser mechanism 70 is triggered before the fuse assembly 42 fails. In other words, the fuse assembly current rating should be higher than the threshold limit for the recloser mechanism 70. Thus, the fuse assembly 42 is a failsafe element and will typically only blow in the case of failure of the recloser mechanism 70.

Cutout 20 also includes a motor module 84 secured to bottom terminal 58. Motor module 84 includes a DC motor 86 and a motor control unit 88. The DC motor 86 is operatively interconnected with the lower contact end 80 of fuse assembly 42 in a manner so as to allow normal pivoting motion when fuse assembly 42 disengages from engaging arm 74. A sensor within motor module 84 may sense the relative position of fuse assembly 42, i.e.. whether it is in the upright/engaged position or the hanging/open position.

The motor module 84 includes a two-way communication system that may both communicate the status of the cutout and receive re-arming commands. For example, the communication system may be a short range wireless transmitter, a SCADA or Ethernet link. The communication system can receive a re-arm command either from a remote location or from a local utility person using short range wireless transmitter. Upon receiving the rearm command, a DC motor 86 pivots the fuse assembly 42 counterclockwise back to the engaged/upright position wherein the upper contact end 78 is again received in catch 76. In this manner cutout 20 enables automatic remote alarming and rearming.

Electrical power is required to energize DC motor 86 upon receiving a reclosing command. Motor module 84 receives power signal S from wireless source 50 via a receiver 90 which includes a second resonator structure (not shown). Thus, motor module 84 is continuously powered during reclosing, even after fuse assembly 42 moves to the open position. Such an arrangement eliminates the need for expensive, unreliable batteries and reduces insulation coordination issues. In one embodiment, the motor module 84 may include a capacitor that is periodically charged by receiver 90 which is in turn continuously transmitted energy from wireless source 50. Such an embodiment may be necessary if the amount of wireless energy transmitted is not sufficient to power the motor module in real time during the reclosing period. A capacitor may also be advantageous in cases where the high voltage line 22 experiences voltage loss.

Figure 4:
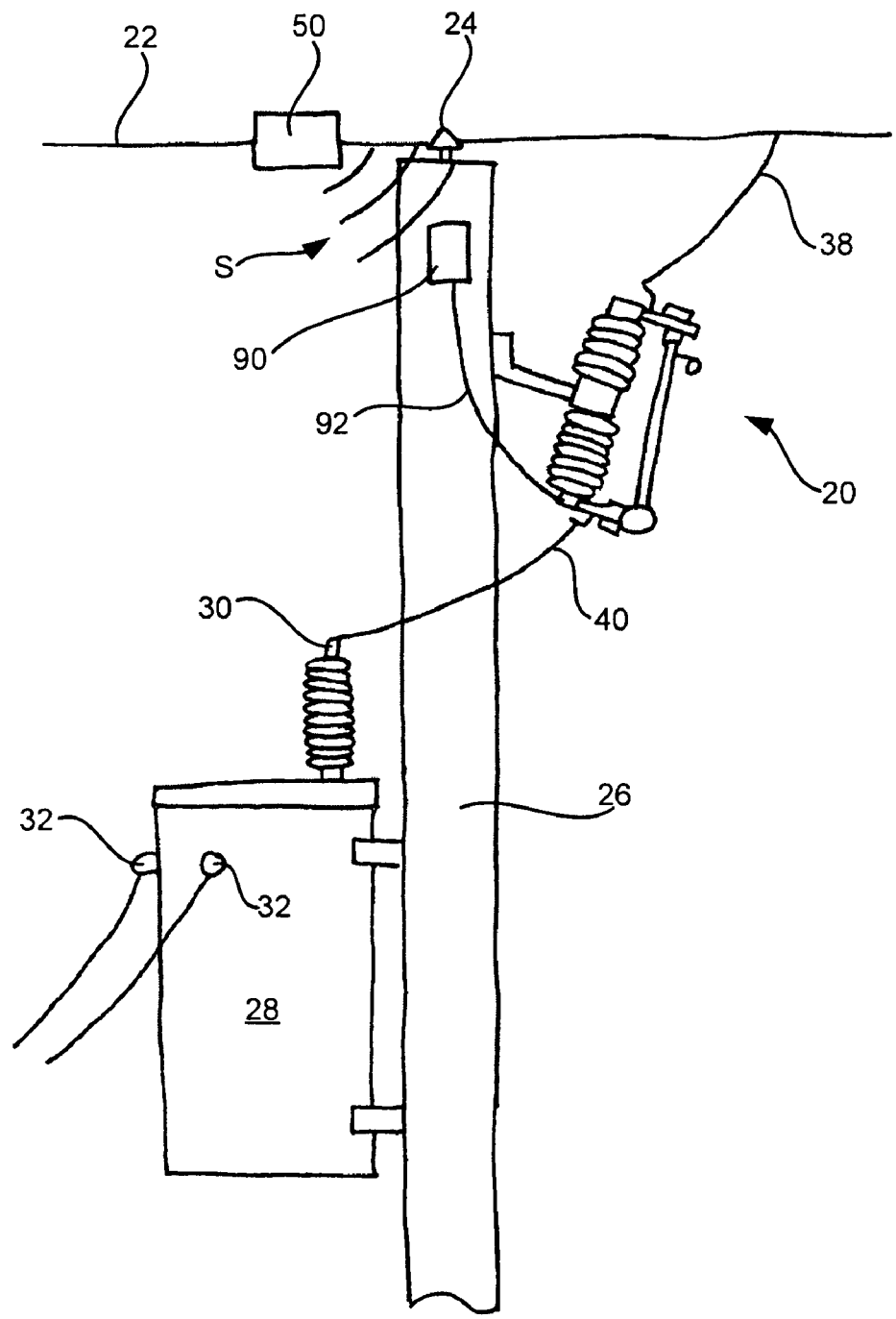
FIG. 4 shows a side view of an alternate cutout powered by a wireless energy transfer mechanism.

Referring now to FIG. 4, an alternate embodiment of the invention is disclosed. The cutout 20 is of substantially identical configuration as that described above, however, receiver 90, instead of being positioned within motor module 84, is spaced therefrom. In such a configuration, a wire 92 transmits the electrical energy from receiver 90 to motor module 84. Such a configuration may become necessary if cutout 20 is positioned too far from wireless source 50. Thus, in this configuration, receiver 90 is positioned closer to source 50 than cutout 20. It should of course be appreciated that receiver 90 must be positioned a sufficient distance from power line 22 to prevent electrical arcing.

Figure 5:
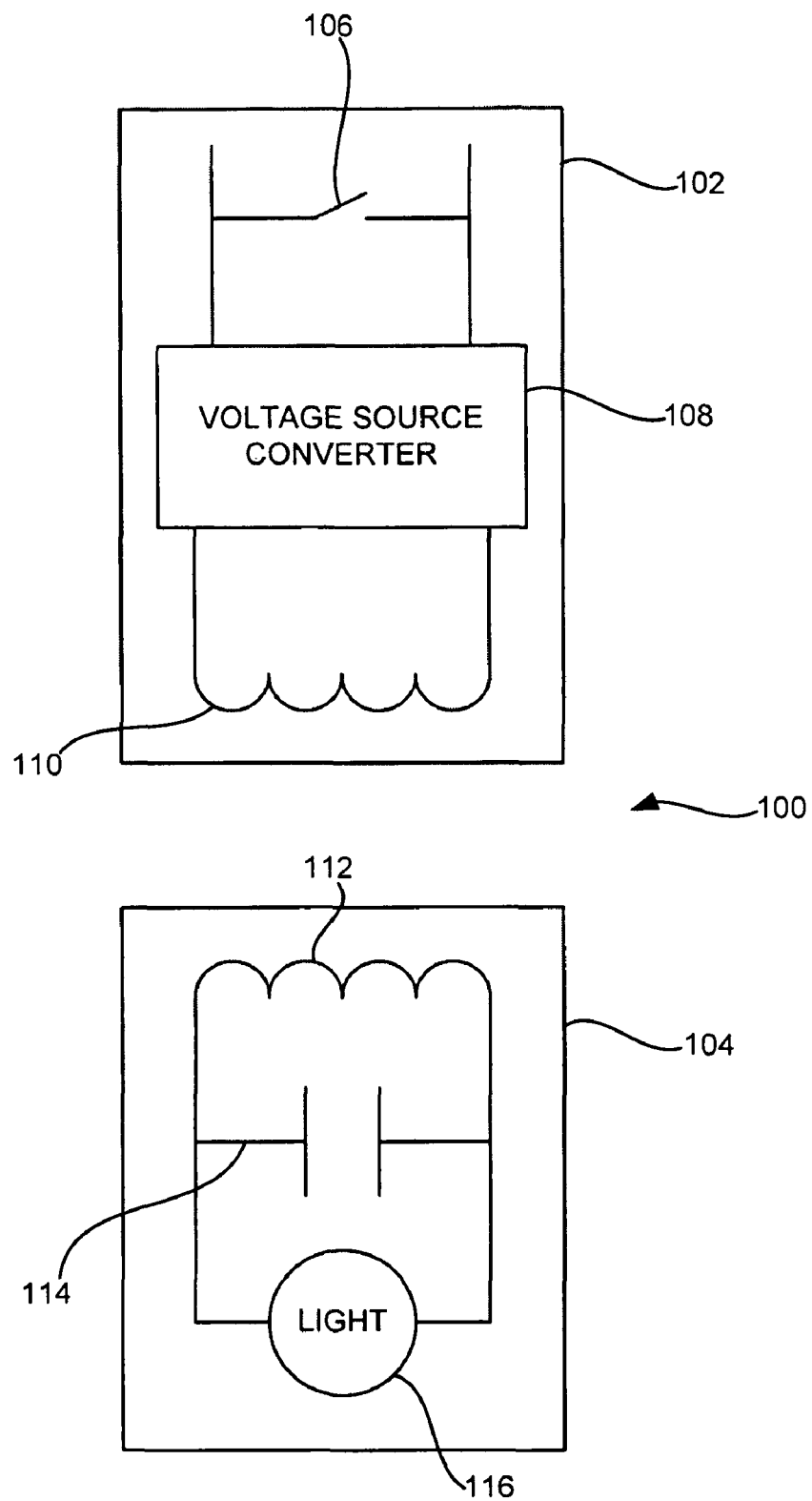
FIG. 5 shows a schematic view of a fault indicator according to the present invention.

Referring now to FIG. 5, an alternate secondary power device in the form of a fault indicator is disclosed and indicated by the numeral 100. Device 100 includes a source module 102 and a receiving module 104. Source module 102 may include a switch 106 operable to energize or de-energize the system. A voltage source converter 108 may be provided to convert, for example scavenged power due to the induced current from the high voltage line, to a usable voltage for the wireless power transmitter. Finally, source module 100 may include a first resonator 110 for receiving the energy from voltage source converter 108 and transmitting electromagnetic energy. Receiving module 104 may include a second resonator 112 that receives the electromagnetic signal/energy and converts that signal to electrical energy. An optional capacitor 114 may be provided to store energy, and a light 116 is provided which, when illuminated, indicates a fault condition. It should be appreciated that additional electronic components may be included, for example, power conditioning components, power monitoring and sensing components and communication components. It should further be appreciated that the schematic of FIG. 5 may also generally describe the powering of motor module 84, wherein light 116 is substituted with motor module 84.

Figure 6:
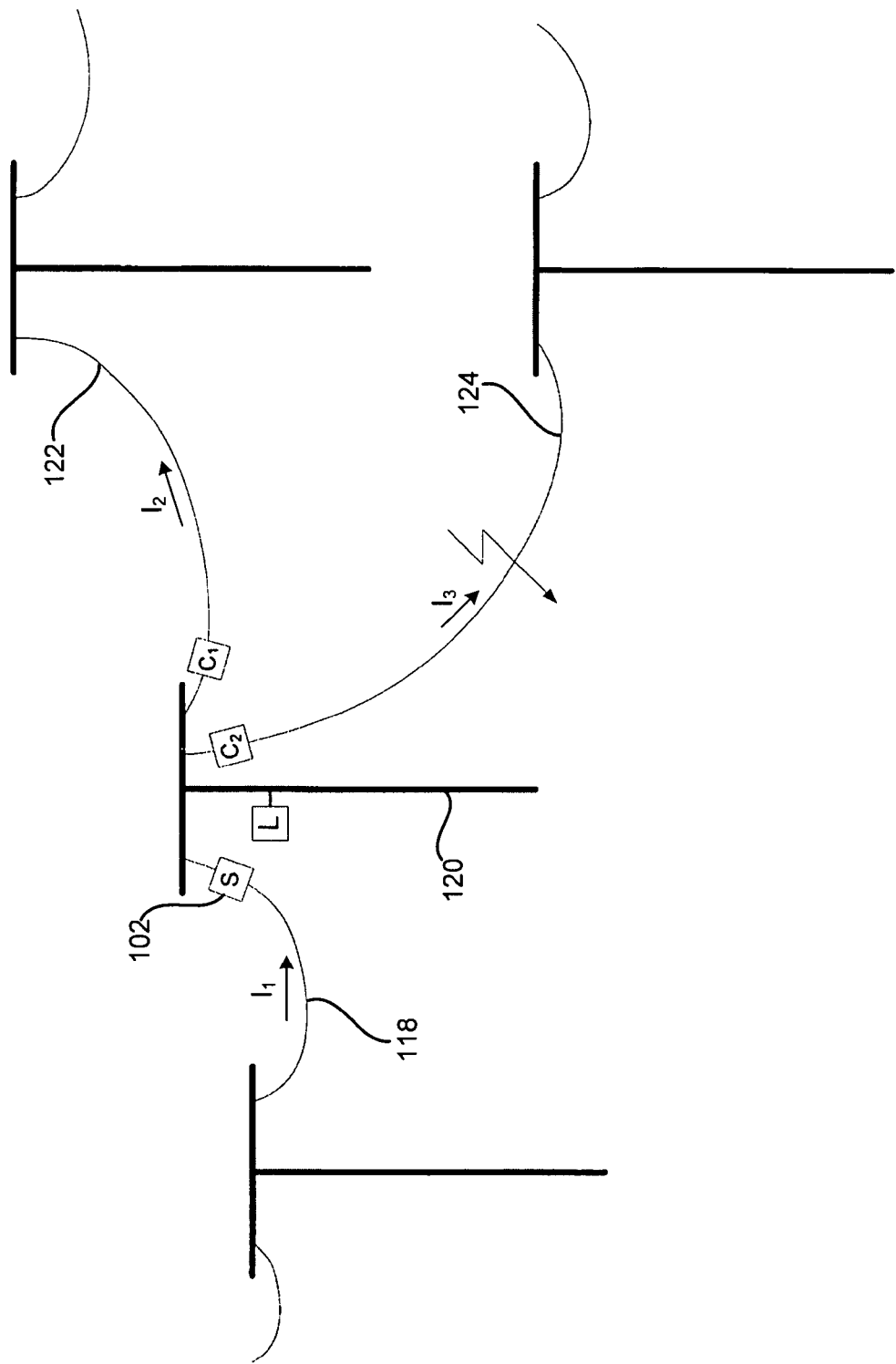
FIG. 6 shows a partially schematic view of an energy distribution network incorporating the fault indicator of the present invention.

Referring now to FIG. 6, an exemplary electrical distribution network is shown that includes a feeder line 118 that carries a current $I_1$. Feeder line 118 terminates at a pole 120, where a second line 122 and third line 124 are electrically connected to feeder line 118. Second line 122 carries current $I_2$ and third line carries current $I_3$. Source module 102 is secured to feeder line 118 and receiving module 104 is secured to pole 120. Receiving module 104 is adapted to provide a visual indication if a fault condition exists on second line 122 or third line 124. For example, second line 122 may include a cutout $C_1$ and third line 124 may include a cutout $C_2$. Cutouts $C_1$ and $C_2$ may be traditional cutouts or may be reclosable cutouts of the type discussed above.

In the case of traditional cutouts, if a fault occurs on third line 124, cutout C2 will trip, opening the circuit and preventing current flow through third line 124. In such an instance a current sensor (not shown) may be secured to third line 124 and recognize that zero current is flowing therethrough. It may then send a wireless signal to receiving module 104 which in turn activates light 116. In one embodiment, light 116 will have a different activation pattern depending upon which line is in a fault condition.

In the case of a reclosing cutout, a sensor positioned on the cutout may sense that the fuse is in the open, fault position and wirelessly transmit a fault signal to receiving module 104. In another embodiment, a current sensor may be located on the cutout and, as above, recognize if zero current is flowing therethrough. In yet another embodiment, the cutout may include a light 116 integral therewith which is activated when the fuse moves to the open position. In each of these embodiments, source module 102 may power just the receiving module 104 (i.e.. light 116) or both the receiving module 104 and the cutout electronics.

Thus, it can be seen that by wirelessly powering the fault indicator, a variety of configurations is possible. Wirelessly powering such devices eliminates many of the insulation coordination issues that exist when using scavenged energy from the primary system to power the secondary electronic equipment in power distribution networks. Further, such secondary devices no longer require large expensive batteries while achieving improved reliability and flexibility.

The invention claimed is:

1. A cutout assembly for use in an electrical distribution network to electrically connect a first electric cable with a second electric cable, the cutout comprising:
    an electrically non-conductive insulator having a first end and a second end;
    a first terminal assembly secured to said first end of said insulator;
    a second terminal assembly secured to said second end of said insulator;
    a fuse assembly pivotally secured to said second terminal assembly and movable between a locked out position and an engaged position;
    a motor module secured to said second terminal assembly and adapted to move said fuse assembly from said locked out position to said engaged position;
    a wireless source electrically connected to the first electric cable and adapted to emit an electromagnetic power signal; and
    a wireless receiver electrically connected to said motor module and adapted to receive said electromagnetic power signal and convert said electromagnetic power signal to electricity to power said motor module.

2. A cutout assembly according to claim 1 wherein said first electric cable is a high voltage line and said wireless source is secured directly thereto.

3. A cutout assembly according to claim 1 wherein said wireless source includes a single-turn transformer adapted to draw power from said first electric cable.

4. A cutout assembly according to claim 1 wherein said wireless source draws power from the first electric cable and emits said electromagnetic power signal at a higher frequency than the frequency of the power drawn from said first electric cable.

5. A cutout assembly according to claim 1 wherein said wireless source includes a first resonator and said wireless receiver includes a second resonator, energy transfer between said first resonator and said second resonator being accomplished by coupling the resonant-field evanescent tails.

6. A cutout assembly according to claim 1 further comprising a reclosing mechanism secured to said first terminal assembly and including an engaging arm that is movable between a contact position and a release position; wherein said engaging arm, when in said contact position, secures said fuse assembly in said engaged position proximate to said first terminal assembly, thereby conducting electricity between the first and second electric cable, said reclosing mechanism adapted to temporarily interrupt power transmission between the first electric cable and the second electric cable upon detection of a fault condition.

7. The cutout assembly of claim 6 wherein said reclosing mechanism temporarily interrupts power transmission a predetermined number of times, and if after said predetermined number of interruptions, the fault condition remains, said engaging arm moves to said release position.

8. The cutout assembly of claim 6 wherein when said engaging arm moves to said release position, said fuse assembly drops to said locked out position, thereby breaking the electrical connection between the first and second electrical cable.

9. The cutout assembly of claim 6 wherein an electrical load that triggers said fault condition in said reclosing mechanism is lower than an electrical load at which said fuse assembly will blow.

10. The cutout assembly of claim 6 wherein said engaging arm is adapted to pivot between said contact position and said release position.

11. The cutout assembly of claim 6 wherein said engaging arm is adapted to move axially between said contact position and said release position.

12. The cutout assembly of claim 6 wherein said reclosing mechanism includes a solenoid, said solenoid is mechanically interconnected to said engaging arm to selectively move said engaging arm between said contact position and said release position.

13. The cutout assembly of claim 12 wherein said reclosing mechanism includes a movable contact and a stationary contact, the temporary interruption of power being caused by moving said movable contact out of physical engagement from said stationary contact.

14. The cutout assembly of claim 1 wherein the motor module includes a communication system adapted to transmit fault condition alerts and to receive commands to move said fuse assembly from said locked out position to said engaged position.

* * * * *